(12) United States Patent
Solberg

(10) Patent No.: US 12,434,896 B2
(45) Date of Patent: Oct. 7, 2025

(54) POUCH TYPE FOOD PAD

(71) Applicant: Cellcomb AB, Säffle (SE)

(72) Inventor: Mikael Solberg, Saltsjöbaden (SE)

(73) Assignee: Cellcomb AB, Säffle (SE)

( * ) Notice: Subject to any disclaimer, the term of this patent is extended or adjusted under 35 U.S.C. 154(b) by 0 days.

(21) Appl. No.: 18/277,863

(22) PCT Filed: Feb. 14, 2022

(86) PCT No.: PCT/SE2022/050154
§ 371 (c)(1),
(2) Date: Aug. 18, 2023

(87) PCT Pub. No.: WO2022/173361
PCT Pub. Date: Aug. 18, 2022

(65) Prior Publication Data
US 2024/0150109 A1 May 9, 2024

(30) Foreign Application Priority Data

Feb. 12, 2021 (SE) .................................... 2150156-4

(51) Int. Cl.
*B65D 81/26* (2006.01)
*B32B 5/02* (2006.01)
(Continued)

(52) U.S. Cl.
CPC .............. *B65D 81/264* (2013.01); *B32B 5/02* (2013.01); *B32B 7/02* (2013.01); *B32B 29/02* (2013.01);
(Continued)

(58) Field of Classification Search
CPC ........ B65D 81/264; B65D 1/34; B65D 65/40; B65D 65/466; B65D 2565/385;
(Continued)

(56) References Cited

U.S. PATENT DOCUMENTS 5,356,678 A 10/1994 Heitzhaus
5,552,169 A 9/1996 Kannankeril
(Continued)

FOREIGN PATENT DOCUMENTS

DE 202010014178 U 1/2012
EP 0395223 A2 10/1990
(Continued)

OTHER PUBLICATIONS

International Search Report and Written Opinion dated Apr. 21, 2022, from PCT Application No. PCT/SE2022/050154.
(Continued)

*Primary Examiner* — Jacob K Ackun
(74) *Attorney, Agent, or Firm* — Joseph T. Leone; DeWitt LLP

(57) ABSTRACT

This invention relates to a pouch-type food pad for use in a food tray to absorb and withhold liquid, comprising an absorbing kernel (11) enclosed in a pouch (10, 12) formed by a first pouch layer (10) and a second pouch layer (12) adjoined by a bond (13), wherein said absorbing kernel (11) comprise two layers (11A, 11B) including a cellulose based support layer (11B) having a grammage between 12-50 g/m², and wherein said first and second pouch layers (10, 12) have a grammage between 10-70 g/m², preferably 12-50 g/m², and wherein the tensile wet strength of at least said first pouch layer (10), preferably both layers (10, 12), is between 5%-50% of the tensile dry strength of said at least first pouch layer (10).

13 Claims, 2 Drawing Sheets

(51) Int. Cl.
  *B32B 7/02* (2019.01)
  *B32B 29/02* (2006.01)
  *B65D 1/34* (2006.01)
  *B65D 65/40* (2006.01)
  *B65D 65/46* (2006.01)

(52) U.S. Cl.
  CPC ............... *B65D 1/34* (2013.01); *B65D 65/40* (2013.01); *B65D 65/466* (2013.01); *B32B 2262/062* (2013.01); *B32B 2307/54* (2013.01); *B32B 2307/718* (2013.01); *B32B 2307/72* (2013.01); *B32B 2307/726* (2013.01); *B32B 2307/748* (2013.01); *B32B 2553/00* (2013.01); *B65D 2565/385* (2013.01)

(58) Field of Classification Search
  CPC .. B32B 5/02; B32B 7/02; B32B 29/02; B32B 2262/062; B32B 2307/54; B32B 2307/718; B32B 2307/72; B32B 2307/726; B32B 2307/748; B32B 2553/00
  USPC .... 206/294, 524.1, 524.4, 557; 428/98, 114, 428/219
  See application file for complete search history.

(56) References Cited

U.S. PATENT DOCUMENTS

| | | |
|---|---|---|
| 6,171,695 B1 | 1/2001 | Fontenot |
| 2002/0007169 A1* | 1/2002 | Graef ..................... D21H 27/32 604/374 |
| 2002/0034912 A1* | 3/2002 | Curro ..................... A47L 13/17 428/103 |
| 2003/0009141 A1* | 1/2003 | Graef ..................... A61F 13/534 604/368 |
| 2003/0144642 A1* | 7/2003 | Dopps ............... A61F 13/53747 604/378 |
| 2006/0219578 A1* | 10/2006 | Owensby ............. B65D 81/264 206/204 |
| 2007/0212968 A1* | 9/2007 | Beu ..................... B65D 81/264 428/141 |
| 2012/0085661 A1* | 4/2012 | Eriksson ................. B32B 27/36 206/204 |
| 2013/0095215 A1* | 4/2013 | Jensen ................... B65D 81/24 426/124 |
| 2013/0243912 A1 | 9/2013 | Jensen |
| 2015/0203272 A1* | 7/2015 | Versteylen ........... B65D 81/268 428/408 |
| 2019/0275781 A1 | 9/2019 | Riehle et al. |

FOREIGN PATENT DOCUMENTS

| | | |
|---|---|---|
| EP | 0833977 B1 | 9/2001 |
| KR | 20080080068 A | 9/2008 |
| WO | WO 9204254 A1 | 3/1992 |
| WO | WO 99/33420 A1 | 7/1999 |
| WO | WO 2019190324 A | 10/2019 |

OTHER PUBLICATIONS

International Preliminary Report on Patentability dated Aug. 15, 2023, from PCT Application No. PCT/SE2022/050154.
Extended European Search Report dated Aug. 29, 2024, for EP Application No. 22753072.2.

* cited by examiner

POUCH TYPE FOOD PAD

TECHNICAL FIELD

This invention relates to a pouch-type food pad, e.g. for use in a food tray to absorb and withhold liquid, comprising an absorbing kernel enclosed in a pouch formed by a first pouch layer and a second pouch layer adjoined by a bond. All materials comprising the pouch-type food pad are natural and cellulose based, fully recyclable in the paper recycling loop and compostable.

BACKGROUND

Food trays with high absorbing pads are commonly used for improving on storage life and freshness of different food products, such as meat, poultry, fish and fruit, by using the food pad to absorb superfluous liquid. There exist many different types of food pads, e.g. single sheet laminated type food pads and pouch type food pads. Pouch-type food pads have the advantage that they eliminate the risk of absorbing material to stick to food product. This is achieved by means of using a permeable material in the pouch, comprising a first and a second layer that are bonded together around a kernel of absorbing material, wherein the layer in contact with the food product is permeable and also resistant to moisture/liquid, thereby eliminating any parts of the pads to stick to the food product. Mostly some kind of superabsorbent (SAP) or superabsorbent fiber (SAF), often in connection with some kind of binder, is being used as the main material in such a pouch-type food pad, e.g. an absorbing laminate as known from US-A-2019275781. The use of food pads has been well accepted by the markets.

However, still there is a desire that the storage of food products could be performed by use of more environmentally friendly materials preferably renewable as well as recyclable and compostable. US-A-2019275781.

From DE-U-202010014178 there is known a pouch-type food pad intended to provide an environmentally friendly alternative, comprising an absorbent kernel in the form of a SAP/SAF-free highly absorbent airlaid material and wherein the pouch includes a breathable, biodegradable film, wherein PLA is suggested to be used in both the Kernel and the pouch film. However, since PLA is not naturally biodegradable and recycling systems for PLA does not exist in most geographies such a pouch-type food pad does not meet highly set ambitions regarding sustainability. It is also a common problem that bioplastics are mixed up with oil-based plastics and pollute the recycling system for these plastics. Hence, there is a need also from that perspective for other alternatives.

The choice of materials of a product is obviously an important aspect regarding the ability to recycle. However, also contamination, e.g. resulting from contact with food, is an aspect that may provide difficulties regarding the recycling process.

SUMMARY OF THE INVENTION

It is an object of the invention to provide a paper-based pouch-type food pad that may facilitate recycling in a paper stream and that also may meet high demands regarding storage life and appearance of food freshness, which is achieved by means of pouch-type food pad according to the independent claim.

Further, thanks to the combination of materials of a food pad according to the invention efficient facilitation of the recycling may be accomplished, which is achieved by selection of materials, the design of their combination and the choice of structures thereof, e.g. providing ability to obtain efficient cleaning of the pad before submission to the recycling process.

It has been found that by the use of a pouch-type food pad according to the invention may also provide a sustainable solution that is cost-efficient.

Preferred embodiments of the invention have properties that provide good rinse ability, e.g. by means of using water.

Moreover, the materials used in the layers 10, 12 of the pouch 10 of the food pad 1, at least on one "contact side", shall preferably have sufficient wet strength in order to remain intact when removed from the food product without leaving any residuals on the food, preferably both sides. It is also an advantage that the side not in contact with the food product remains intact when removed from the tray or carrier, e.g. if separation is required. Tests have shown that teabag paper 10-30 g/m$^2$ (both bleached and unbleached), filter paper 15-60 g/m$^2$, preferably 20-40 g/m and kraft paper 10-50 g/m$^2$ (both bleached and unbleached) fulfil this desired property.

Further, the lamination strength of the bond 13, in wet condition—of the pouch 10 of the food pad 1 preferably is sufficient, to permit removal of a food product without delamination. More preferred the lamination strength should also be sufficient for allowing rinsing with water and squeezing of the pad, without delamination of the bond, e.g. to facilitate ease of a recycling process. Test (using test pieces with a bond length of 25 mm long of) have shown that a lamination strength of the bond 13 in wet condition preferably should be at least 0,4 N/25 mm, more preferred 0,5 N/25 mm.

However, the materials 10, 12, 11 of the food pad 1 preferably should not be too wet-strong to facilitate disintegration in a later stage of the recycling process. Tests have shown that a lamination strength of the bond 13 in wet condition, preferably should be less than 5 N/25 mm, more preferred less than 3 N/25 mm.

Moreover, it is preferable that the pouch layer 10, 12, i.e. surface materials, are sufficiently penetrable by liquids to facilitate rinsing, preferably in water, to achieve a desired level of rinsing. Test have shown that preferably at least one of the layer materials 10, 12, shall be either teabag paper 10-30 g/m$^2$ or filter paper 15-60 g/m$^2$ wherein one layer may be kraft paper 10-50 g/m$^2$, more preferred both layer materials 10, 12, shall be either teabag paper 10-30 g/m$^2$ and/or filter paper 15-60 g/m$^2$. Regarding teabag paper test have indicated that unbleached may provide better rinse ability than bleached.

Specifically tested have indicated good results regarding rinsing for all of the materials/combinations mentioned above, i.e. that at least 75% of absorbed material can be rinsed out, and even as high 90% and more regarding the above-mentioned preferred ranges Further, verifying tests regarding recyclability were performed according to the European standard EN 13 430, which tests showed that all of the pouch layer materials mentioned above are suitable for recycling, e.g. were well disintegrated after 15 minutes. All tested materials also showed an advantageous level of reject rate, i.e. preferably below 15%.

According to a further aspect to the invention:
the tensile strength of the of said at least first pouch layer (10) is between 0,5 to 4 N/50 mm, preferably 0.8-2 N/50 mm, in wet condition measured on a 50 mm wide strip of material in a tensile strength tester, which may optimize both regarding use and recycling, the absorbing kernel (11) comprises a high absorbing layer (11A) comprising 15-100% mechanical pulp, preferably CTMP, having a grammage between 50-1300 g/m², which may optimize regarding absorption and/or handling and/or cost, wherein preferably the thickness (TA) of said high absorbing layer (11A) is at least two times larger than the thickness (TB) of said support layer (11B), the absorbing kernel (11) has a density of 50-300 g/dm³, more preferred 80-225 g/dm³, which may optimize regarding absorption and/or handling and/or cost, whole food pad (1) is made from natural fiber materials that are recyclable, and preferably also Food tray with the food pad, which may optimize both regarding use and recycling.

BRIEF DESCRIPTION OF THE DRAWINGS

In the following the invention will be described more in detail with reference to the annexed drawing, wherein.

DETAILED DESCRIPTION

Figure 1:
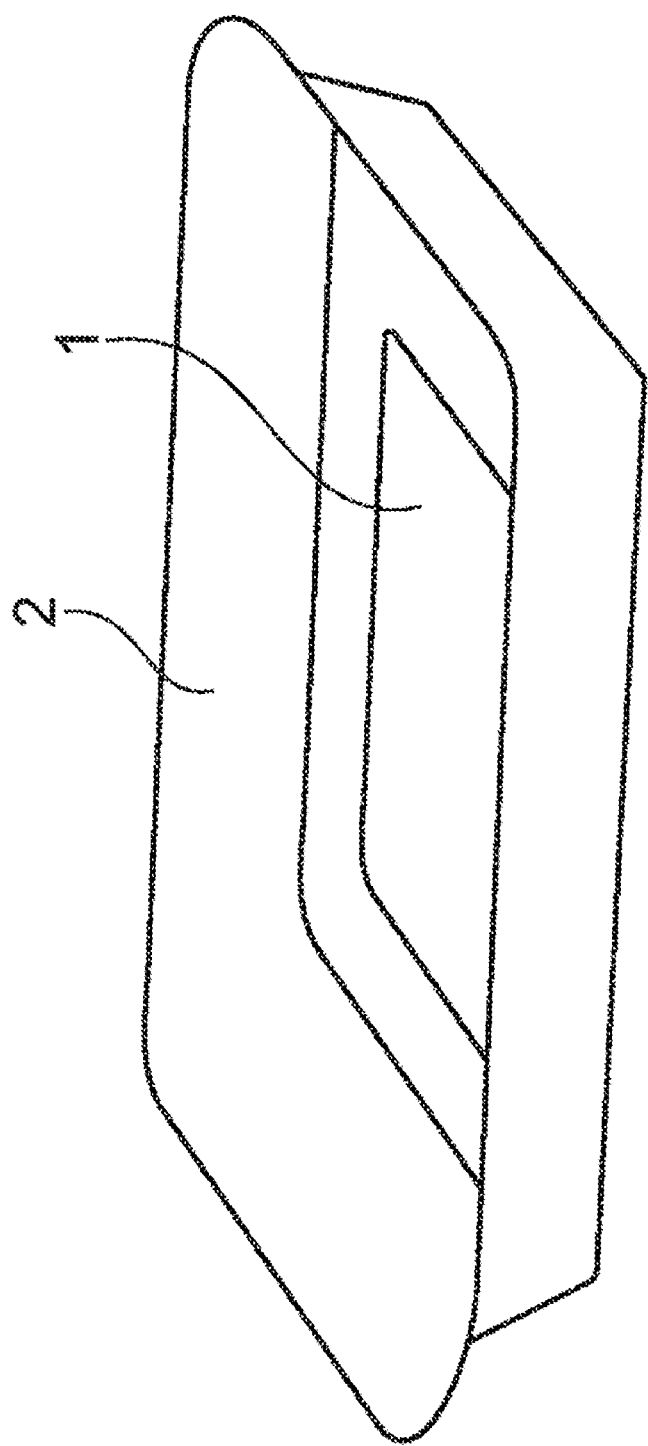
FIG. 1 shows a food tray containing a pouch-type food pad.

In FIG. 1 there is shown a food tray 2 of well-known kind, as an exemplary use for a food pad 1 according to the invention. On the bottom within the food tray 2 there is positioned a pouch-type food pad 1 according to the invention. It is evident that any kind of food tray (also other devices fulfilling a similar purpose) may be used together with the food pad 1. However, special advantages may be gained by using a food tray made in a recyclable material, such as cellulose, not at least in connection with recycling.

Figure 2:
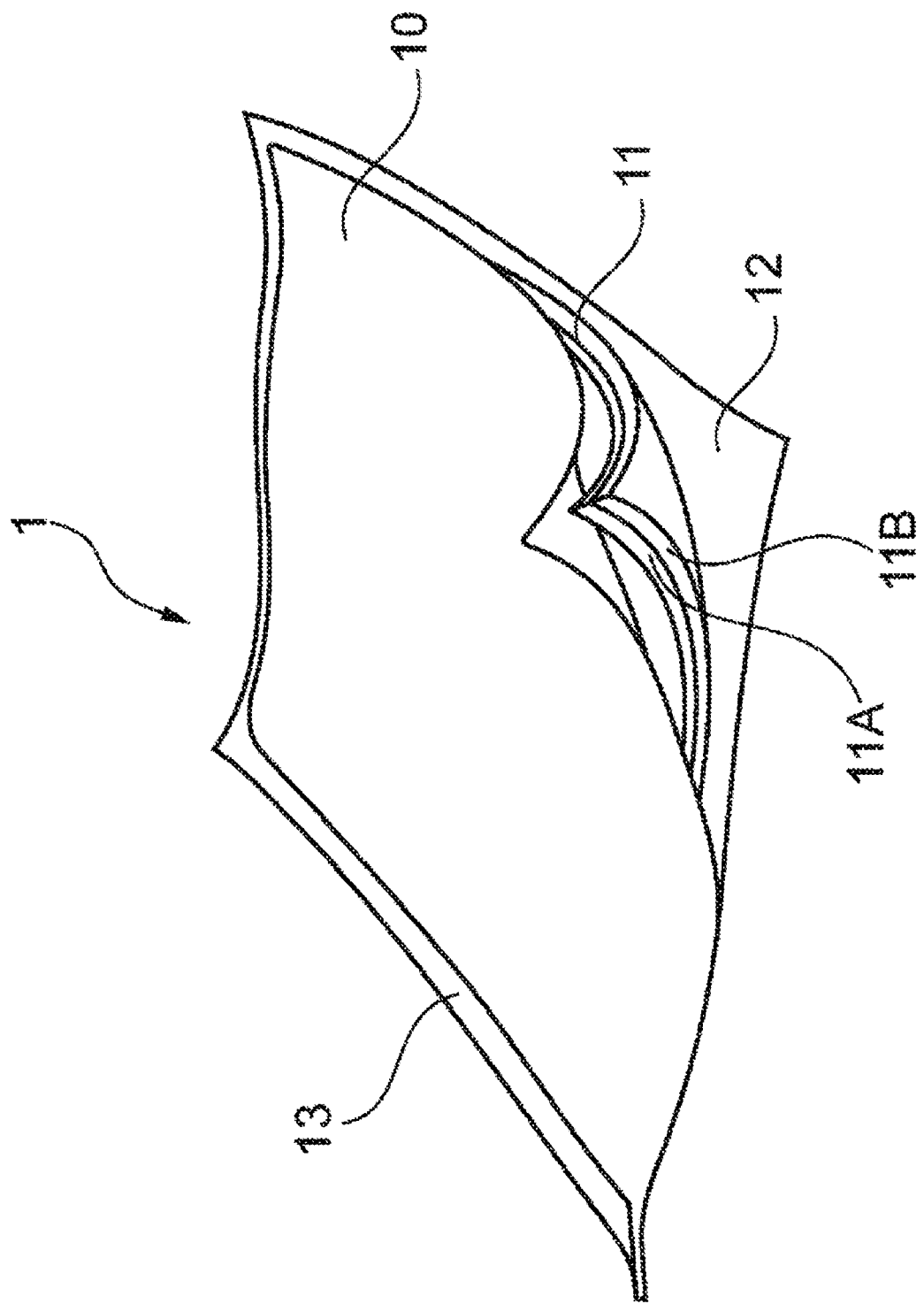
FIG. 2 shows a schematic perspective view of a pouch-type food pad according to the invention.

In FIG. 2 there is shown a pouch-type food pad 1 according to the invention, having a first pouch layer 10, a second pouch layer 12 and a kernel 11. The first and the second pouch layers 10, 12 are adjoined at their edges by means of bond 13, which preferably is continuous. It is foreseen that one side of the pad may be achieved by means of folding, i.e. to thereby create one side of the pouch 10, 12 in the form of a fold.

Within the space formed by the pouch 10, 12, 13 there is positioned a kernel 11 of a high absorbing material. The high absorbing material 11 is of a kind that does not contain any substantial amounts of superabsorbent polymers (SAP) or superabsorbent fibers (SAF) or PLA. Nor does the kernel 11 comprise any substantial amount of binding material. Instead the kernel 11 comprises high yield natural fibers, preferably containing at least 15% more preferred 100% of high yield natural recyclable fibers. The kernel is preferably produced in accordance with an air-laid method or has in a previous step been produced with an air-laid method or a method providing similar properties, e.g. described for example in WO99/33420A1. Another possible method which avoids the usage of any binders or thermal bonding can be found in EP0833977B1.

The kernel 11 comprises a high absorbing layer 11A, of chemical pulp or mechanical pulp. Preferably, the high absorbing layer 11A comprising 15-100%, more preferred 55-100%, most preferred 75-100%, mechanical pulp. Most preferred the mechanical pulp is CTMP. The high absorbing layer 11A has a grammage between 50-1300 g/m², preferably between 100-1200 g/m², more preferred 200-800 g/m². The cellulose-based support layer 11B has a grammage between 12-50 g/m², preferably 15-25 g/m².

The kernel 11 may be produced in connection with compressing it, e.g. between rolls arranged with an appropriate pattern, to a thickness of between 1-15 mm. This results in a kernel with a density of 50-300 g/dm 3 or more preferred 80-225 g/dm³.

The thickness TA of the high absorbing layer 11A is preferably significantly larger than the thickness TB of the support layer 11B, at least two times larger than the thickness TB of the support layer 11B. Preferably TA>5 TB, more preferred TA>8 TB.

The pouch material 10,12 is of a kind that does not contain any substantial amounts (preferably none at all) of superabsorbent polymers (SAP) or superabsorbent fibers (SAF) or PLA and contains at least 80% more preferred 100% paper recyclable raw material fibers, i.e. cellulose or equivalent natural fibers or pouch material derived from natural fibers. Example of such pouch natural raw materials are preferably mainly cellulose fibers combined with less than 50% hemp and/or abaca fibers.

The pouch material 10,12 is of a grammage between 10-70 g/m² most preferred between 15-50 g/m². The first layer 10 of the pouch 1 is intended for direct contact with the food product (e.g. meat, fish, etc).

The second layer 12, not intended for direct contact with the food product, may be made in the same material as the first layer 10. However, it may be made of a different material, than the first layer 10, and still fulfill the basic function of the invention. Nevertheless, in the preferred mode the whole pouch-type food pad should be made from virgin recyclable paper natural fibers, for which there exist a variety of raw materials, e.g. kraft paper, filter paper, glassine paper, tea bag paper and tissue.

One, or both of the, layer/s 10, 12 may be perforated in order to safeguard a high degree of permeability of liquid.

If the materials are not perforated it is advantageous to choose materials/combinations that are sufficiently permeable to facilitate both absorption and good rinsing properties.

The materials used in the first layer 10, preferably also the second layer 12, shall have a certain wet strength to avoid material disintegration on the surface of the food product. The tensile strength of the materials should be between 0,5 to 4 N/50 mm, preferably 0.8-2 N/50 mm, in wet condition measured on a 50 mm wide strip of material in a tensile strength tester. This corresponds to 5-50% of the tensile strength of the material itself in dry condition. Preferably a material is used wherein the tensile strength of the material itself in wet condition is between 10-30% of the tensile strength in dry condition. The lower limit of the tensile strength interval is motivated from a material strength perspective in the intended use situation and the upper limit is to maximize the yield in the recycling process.

The bond, 13, is designed in a way such that the strength of the bond is sufficient both in wet (during use) and dry condition (pre use), which strength may vary depending on specific needs/desires. The layers 10 and 12 may be glued together using one or two continuous layer(s) of hotmelt glue. The tensile strength of the bond in wet condition should be at least 10-30% of the tensile strength of the bond in dry condition. Preferably, the tensile strength is balanced in such a way that it matches (on a similar level) the strength of the layers 10 and 12 in wet condition. This bond strength may be measured on a 25 mm strip in a tensile strength tester.

The strength of the bond may, in some applications, be higher than the strength of the layers 10 and 12 in wet condition thus creating a material breakage of the pouch materials rather than disintegration of any of the layers 10,12.

Thanks to the invention an environmentally friendly fully paper recyclable and compostable food package may be achieved that provides surprising advantages compared to prior art food packages. Tests have shown that the use of pouch-type food pad 1 according to the invention in a food tray 2 for storing of meat may meet high demands.

Further, the verification of the recyclability was done according to the European standard EN 13 430 in the following sequence:
1. Pulping (standard ISO 5263-1) using so called neutral conditions (pulping duration 15 minutes, consistency 3%, pulping temperature 40 degrees Celsius, no addition of chemicals).
2. Visual observation of the fibrous suspension and the color of the water.
3. Screening of unwanted material removal (TAPPI ANSI T275 sp-18). Somerville apparatus.
4. Optional cleaning. Not used because it was unnecessary.
5. Visual aspect hand sheets manufactured (Standard NF EN ISO 5269-2).

All tested materials and combinations of materials showed reject rates below 15% which is very advantageous and in line with newspaper material.

It is evident for the skilled person that the above described merely represent examples of use for the inventive food pad according to the invention, e.g. that there are various applications where a food pad according to the invention may fulfil a similar beneficial function as together with a food tray.

The invention claimed is:

1. Pouch-type food pad for use in a food tray, or similar item, to absorb and withhold liquid, comprising an absorbing kernel (11) enclosed in a pouch (10, 12) formed by a first pouch layer (10) and a second pouch layer (12) adjoined by a bond (13), characterized in that said whole food pad (1) is made from natural virgin fiber materials, that facilitate recycling, said absorbing kernel (11) comprising two layers (11A, 11B) including a cellulose based support layer (11B) having a grammage between 12-50 g/m$^2$, and wherein said first and second pouch layers (10, 12) have a grammage between 10-70 g/m$^2$, preferably 12-50 g/m$^2$, and wherein the tensile wet strength of at least said first pouch layer (10), preferably both layers (10, 12), is between 5%-50% of the tensile dry strength of said at least first pouch layer (10), more preferred between 10%-30%.

2. Pouch-type food pad according to claim 1, characterized in that said tensile strength of said at least first pouch layer (10) is between 0.5 to 4 N/50 mm, preferably 0.8-2 N/50 mm, in wet condition measured on a 50 mm wide strip of material in a tensile strength tester.

3. Pouch-type food pad according to claim 1, characterized in that said absorbing kernel (11) comprises a high absorbing layer (11A) comprising 15-100% mechanical pulp, preferably CTMP, having a grammage between 50-1300 g/m$^2$, more preferred said high absorbing layer (11A) comprises 55-100% mechanical pulp, even more preferred 75-100% mechanical pulp.

4. Pouch-type food pad according to claim 3, characterized in that said high absorbing layer (11A) having a grammage between 100-1200 g/m$^2$, more preferred 200-800 g/m$^2$.

5. Pouch-type food pad according to claim 3, characterized in that the thickness (TA) of said high absorbing layer (11A) is at least two times larger than the thickness (TB) of said support layer (11B), wherein preferably TA>5 TB, more preferred TA>8 TB.

6. Pouch-type food pad according to claim 1, characterized by said support layer (11B) having a grammage between 15-25 g/m$^2$.

7. Pouch-type food pad according to claim 1, characterized in that the absorbing kernel (11) has a density of 50-300 g/dm$^3$, more preferred 80-225 g/dm$^3$.

8. Pouch-type food pad according to claim 1, characterized in that the material of at least one of the pouch layers (10, 12) is teabag paper 10-30 g/m$^2$ or filter paper 20-50 g/m$^2$, wherein optionally one pouch layer may be kraft paper 10-50 g/m$^2$, and wherein more preferred the material of both pouch layers (10, 12) is teabag paper 10-30 g/m$^2$ and/or filter paper 20-50 g/m$^2$.

9. Pouch-type food pad according to claim 1, characterized in that said bond (13) has a lamination strength in wet condition of at least 0,4 N/25 mm, preferably at least 0.5 N/25 mm, and more preferred less than 5 N/25 mm, more preferred less than 3 N/25 mm.

10. Pouch-type food pad according to claim 1, characterized in that level of reject rate of a recycled food pad (1) is below 30%, preferably below 25%, more preferred below 20%.

11. Pouch-type food pad according to claim 1, characterized in that the density of at least the material in the pouch the material of at least one of the pouch layers (10, 12) is less than 0.8 kg/dm$^3$, preferably both layers (10,12).

12. Pouch-type food pad according to claim 11, characterized in that the density of at least the material in the pouch the material of at least one of the pouch layers (10, 12) is less than 0.65 kg/dm$^3$, more preferred less than 0.5 kg/dm$^3$.

13. Food tray comprising a pouch type food pad according to claim 1, characterized in that said food tray (2) is made of recyclable raw material, preferably cellulose or equivalent natural fibers or pouch material derived from natural fibers.

* * * * *